United States Patent
Chen et al.

(10) Patent No.: US 9,811,145 B2
(45) Date of Patent: Nov. 7, 2017

(54) REDUCTION OF IDLE POWER IN A COMMUNICATION PORT

(71) Applicant: Intel Corporation, Santa Clara, CA (US)

(72) Inventors: Huimin Chen, Portland, OR (US); Kok Hong Chan, Folsom, CA (US); Kian Leong Phang, Bayan Lepas (MY); Karthi Vadivelu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 380 days.

(21) Appl. No.: 13/720,531

(22) Filed: Dec. 19, 2012

(65) Prior Publication Data

US 2014/0173166 A1    Jun. 19, 2014

(51) Int. Cl.
G06F 1/32       (2006.01)
G06F 13/40      (2006.01)
G06F 1/26       (2006.01)

(52) U.S. Cl.
CPC .......... G06F 1/3253 (2013.01); G06F 1/3215 (2013.01); *G06F 1/26* (2013.01); *G06F 1/3278* (2013.01); *G06F 13/4022* (2013.01); *Y02B 60/126* (2013.01); *Y02B 60/1235* (2013.01)

(58) Field of Classification Search
CPC ........ G06F 1/32; G06F 1/3203; G06F 1/3206; G06F 1/3215; G06F 1/3234; G06F 1/325; G06F 1/3253; G06F 1/26; G06F 1/3278; G06F 13/4022
USPC ...... 710/15, 17–18, 300–302, 305–306, 316; 713/300, 320, 323
See application file for complete search history.

(56) References Cited

U.S. PATENT DOCUMENTS

| 7,024,504 | B2 | 4/2006 | Saito et al. | |
|---|---|---|---|---|
| 7,076,683 | B2* | 7/2006 | Saito et al. | 713/601 |
| 7,805,624 | B2 | 9/2010 | Inai | |
| 8,255,708 | B1* | 8/2012 | Zhang | 713/300 |
| 8,683,091 | B2* | 3/2014 | Chen et al. | 710/17 |
| 8,683,097 | B2* | 3/2014 | Chen et al. | 710/32 |
| 2005/0138239 | A1* | 6/2005 | Kasahara | 710/33 |
| 2006/0053238 | A1* | 3/2006 | Hung et al. | 710/62 |
| 2006/0076977 | A1* | 4/2006 | Zhu | 326/86 |

(Continued)

FOREIGN PATENT DOCUMENTS

| CN | 101089837 A | 12/2007 |
|---|---|---|
| CN | 102446148 A | 5/2012 |
| WO | 2014/099533 A1 | 6/2014 |

OTHER PUBLICATIONS

Peacock, Craig. "USB in a Nutshell". Chapter 2—Hardware. Online Sep. 17, 2010. Retrieved from Internet Oct. 6, 2014. <http://www.beyondlogic.org/usbnutshell/usb2.shtml>.*

(Continued)

*Primary Examiner* — Thomas J Cleary
(74) *Attorney, Agent, or Firm* — International IP Law Group, P.L.L.C.

(57) ABSTRACT

Techniques for reducing idle power consumption of a port are described herein. An example method includes determining device presence using a pull-down resistor disposed in a downstream port. The method also includes initiating a low power state of a link between the downstream port and an upstream device. The method also includes disabling the pull-down resistor in response to initiating the low power state.

20 Claims, 5 Drawing Sheets

(56) References Cited

U.S. PATENT DOCUMENTS

| | | | |
|---|---|---|---|
| 2006/0179336 A1* | 8/2006 | Rose et al. | 713/320 |
| 2007/0152738 A1* | 7/2007 | Stopel et al. | 327/538 |
| 2008/0155489 A1* | 6/2008 | Komatsu et al. | 716/10 |
| 2009/0063717 A1* | 3/2009 | Bohm et al. | 710/8 |
| 2010/0042861 A1 | 2/2010 | Lee | |
| 2010/0109706 A1* | 5/2010 | Howe et al. | 326/82 |
| 2010/0281197 A1* | 11/2010 | Leydier et al. | 710/106 |
| 2011/0260680 A1 | 10/2011 | Veselic et al. | |
| 2012/0011286 A1 | 1/2012 | Wong et al. | |
| 2012/0023344 A1 | 1/2012 | Miyanaga | |
| 2013/0054983 A1* | 2/2013 | Zhou | 713/300 |
| 2013/0054995 A1* | 2/2013 | Dove | H04L 12/40032 713/323 |
| 2013/0073777 A1* | 3/2013 | Monks et al. | 710/316 |

OTHER PUBLICATIONS

Brain, Marshall. "How USB Ports Work". Online Apr. 1, 2000. Retrieved from Internet Oct. 6, 2014. <http://computer.howstuffworks.com/usb1.htm/printable>.*
"USB 3.0: Delivering SuperSpeed with 25% Lower Power". Draft 10. LeCroy Protocol Solutions Group. LeCroy Corporation. 2010.*
International Search Report and Written Opinion received for PCT Patent Application No. PCT/US2013/074315, dated Mar. 17, 2014, 12 pages.
Compaq et al., "Universal Serial Bus Specification", Revision 2.0, Apr. 27, 2000, 76 pages.
USB Implementers Forum, Inc., "Iner-Chip USB Supplemental to the USB 2.0 Specification," Revision 1.0, Mar. 13, 2006, 48 pages.
Supplementary European Search Report, EP Application No. EP13864003, dated Jul. 8, 2016, 2 pages.
CN Search Report, CN Application No. 201380060338.X, dated Aug. 12, 2016, 2 pages.

* cited by examiner

500

REDUCTION OF IDLE POWER IN A COMMUNICATION PORT

BACKGROUND

USB is an industry protocol designed to standardize the interfaces between computer devices for communication and supplying electrical power. The USB2 protocol has enjoyed widespread adoption in nearly every computing device, and has received tremendous support in terms of technology development with well-established intellectual property (IP) portfolios and standardized software infrastructure.

The USB2 specification uses 3.3 Volt analog signaling for communications between the two USB2 ports. This can result in relatively high levels of power consumption, even during link idle states. As a result, USB2 may not be suitable for devices that place stringent specifications on I/O power consumption, such as mobile platforms.

DESCRIPTION OF THE EMBODIMENTS

Embodiments described herein relate to techniques for reducing idle power consumption during low power link states of a communication interface, such as USB, USB2, and USB3, among others. A USB2 interface, for example, uses a set of passive pull-up and pull-down resistors to determine device presence. Thus, the USB2 link maintains a constant direct current (DC) path, formed by device passive pull-up and host passive pull-down, when the link is idle. The wire voltage is read by the host to determine the connection status of the device. Due to the pull-up and pull-down resistors, the standard USB2 consumes approximately 600 µW or 1 mW of power when the link is in a low power state, such as L1 or Suspend.

The present disclosure describes techniques for reducing or eliminating the power consumption of a communication link when the link is in a low power state, for example, L1 or Suspend in the case of USB2. Consumption of idle power may be reduced by disabling the pull-down resistors disposed in the host port during the low power state of the link. In some embodiments, a new device presence detection process can be used for detecting device disconnect during the low power state, resulting in very low power consumption while in idle mode.

Figure 1:
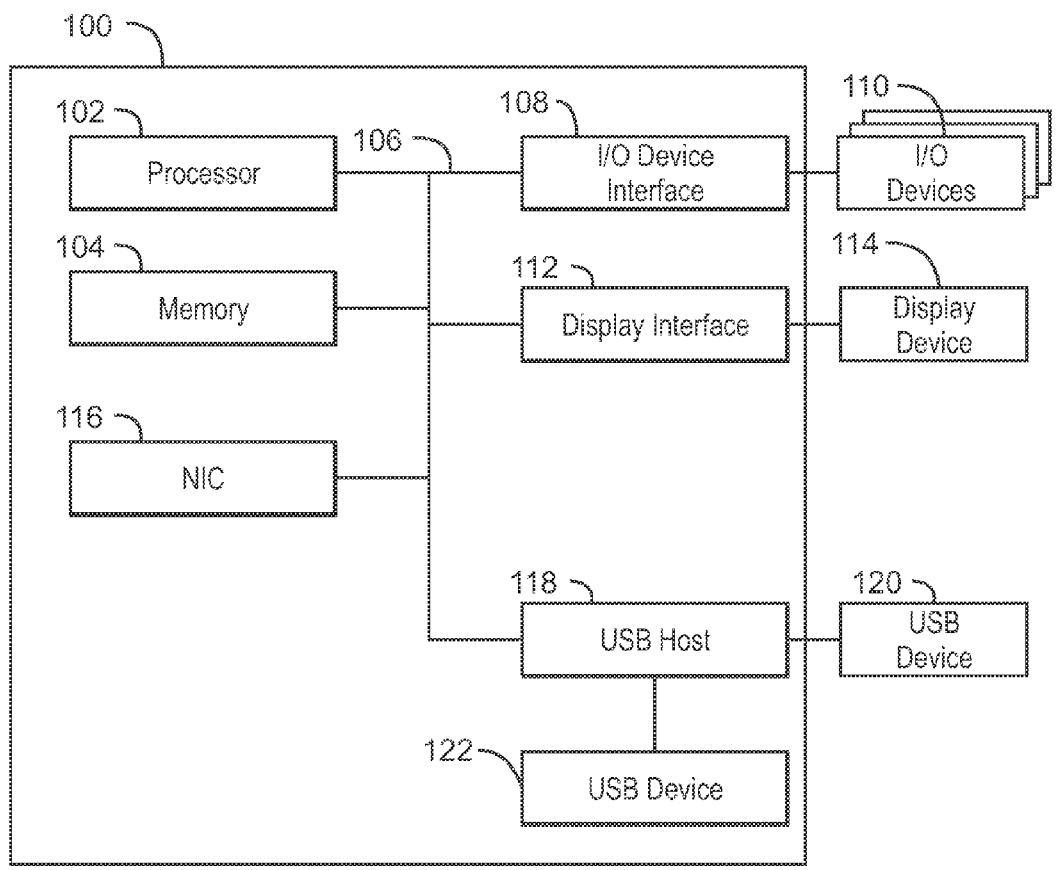
FIG. 1 is a block diagram of an example of a computing system that communicates data between a universal serial bus (USB) interface and a USB device.

FIG. 1 is a block diagram of an example of a computing system that communicates data between a universal serial bus (USB) interface and a USB device. The computing system 100 may be, for example, a mobile phone, laptop computer, desktop computer, or tablet computer, among others. The computing system 100 may include a processor 102 that is configured to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 102 may be connected through a system bus 106 (e.g., PCI, ISA, PCI-Express, HyperTransport®, NuBus, etc.) to an input/output (I/O) device interface 108 adapted to connect the computing system 100 to one or more I/O devices 110. The I/O devices 110 may include, for example, a keyboard and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100.

A network interface card (NIC) 116 may be adapted to connect the computing system 100 through the system bus 106 to a network (not depicted). The network (not depicted) may be a wide area network (WAN), local area network (LAN), or the Internet, among others.

A USB host port 118 may be adapted to connect to the computing system 100 through the system bus 106. The USB host port can be any suitable USB protocol port, including USB2 and USB3, for example. The USB host port 118 may communicate with USB devices, including external USB devices 120 and embedded USB devices 122. As used herein, the term external USB device refers to a USB device that is coupled to the USB host port 118 through a connector that enables the external USB device 120 to be physically disconnected. The term embedded USB device refers to a USB device that is connected to the same circuit board as the USB host port 118 and communicates with the USB host port 118 through an inter-chip communication link, where the host has the knowledge of the device presence. Furthermore, the USB host port 118 may be referred to herein as the downstream port and the USB device 120 or 122 may be referred to as the upstream device, which may include an upstream port. The terms downstream port, upstream port, and upstream device are thus used to refer to ports or devices facing downstream or upstream. For example, the downstream port faces downstream and the upstream device faces upstream. As explained further below in relation to FIGS. 2-5, the USB host port 118 is configured to reduce or substantially eliminate power consumption in the USB host port 118 when the link between the USB host port 118 and the USB device 120 or 122 is in a low power state.

It is to be understood that the block diagram of FIG. 1 is not intended to indicate that the computing system 100 is to include all of the components shown in FIG. 1. Rather, the computing system 100 can include fewer or additional components not illustrated in FIG. 1 (for example, additional USB ports, additional network interfaces, etc.). Furthermore, although embodiments of the present techniques are described in relation to a USB protocol, it will be appreciated that the techniques described herein may also be used in other suitable communication protocols.

Figure 2:
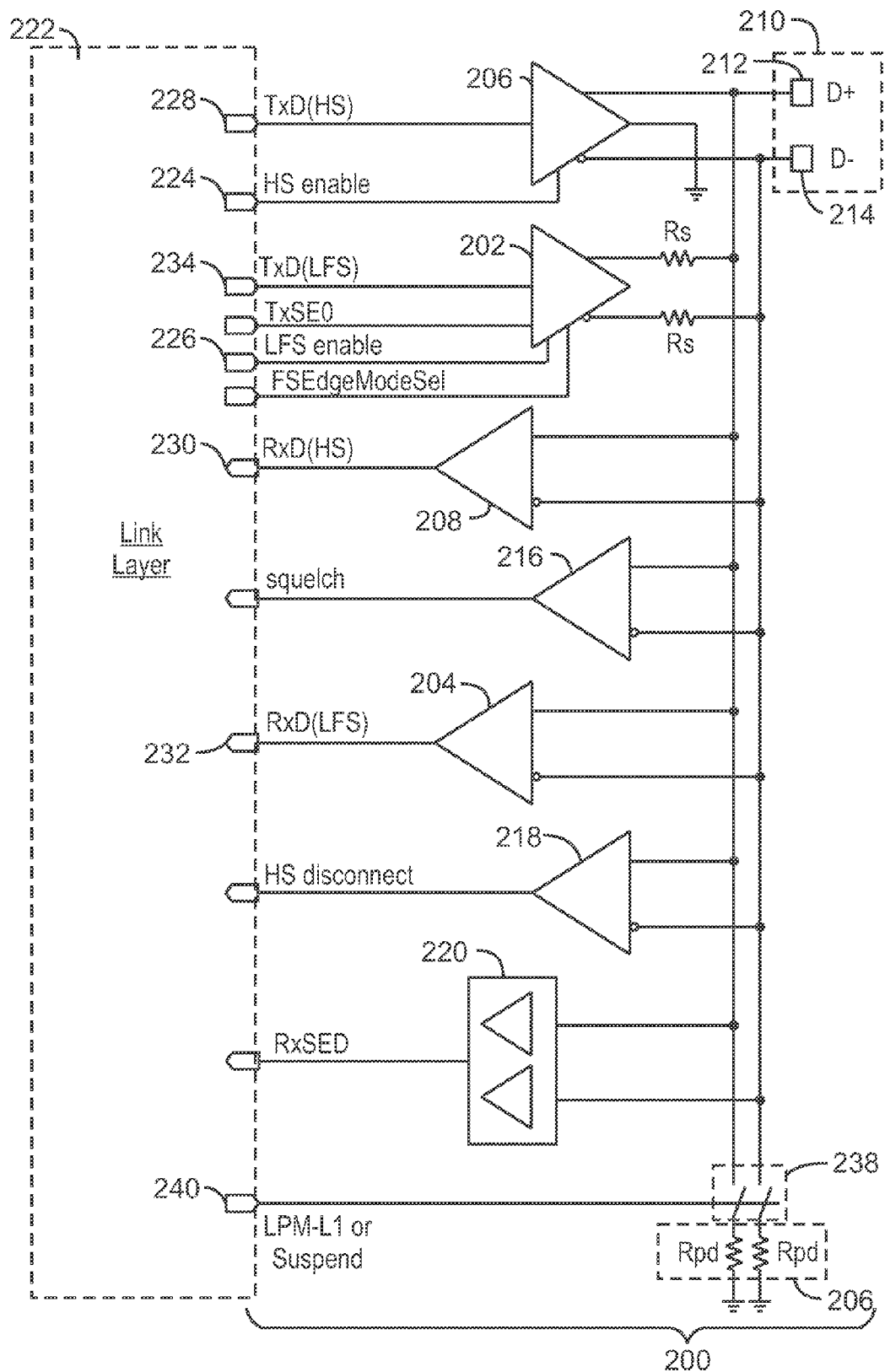
FIG. 2 is a block diagram of a USB physical layer configured to eliminate idle power consumption of a link during a low power state of the link.

FIG. 2 is a block diagram of a USB physical layer configured to eliminate or reduce idle power consumption of a link during a low power state of the link. In embodiments, the HS, FS, and LS data rates correspond to the data rates specified by the USB2 protocol. For example, during LS operation the USB physical layer 200 (also referred to herein as the PHY 200) may provide a data rate of approximately 1.5 Mbit/s, during FS operation the PHY may provide a data rate of approximately data rate of 12 Mbit/s, and during HS operation, the PHY may provide a data rate of approximately 480 Mbit/s. The USB PHY 200 can include a Low-Speed/Full-Speed (LS/FS) transmitter 202 and receiver 204 and a High-Speed (HS) transmitter 206 and receiver 208. The transmitters 202 and 206 and receivers 204 and 208 are communicatively coupled to differential signal lines 210, which include D+ 212 and D− 214. The PHY 200 is configured so that either the HS transmitter 206 and receiver 208 or the LS/FS transmitter 202 and receiver 204 take control of the signal lines 210 depending on the data rate capabilities of the upstream device connected to the PHY 200.

The PHY 200 can also include a squelch detector 216, a HS disconnect detector 218, and a Single-Ended Zero (SE0) detector 220. The squelch detector 216 is configured to detect line activity. The HS disconnect detector 218 is an analog envelope detector to detect device disconnect when operating at HS and the link is in L0.

The PHY 200 is controlled by a Link layer 222, which controls the PHY 200 through various data and control lines coupled between the Link layer 22 and various elements of the PHY 200. For example, as shown in FIG. 2, enable signals 224 and 226 are used to selectively enable the LS/FS transmitter 202 or the HS transmitter 206, respectively. Driver input 228 is coupled to the HS transmitter 206 for driving the HS transmitter 206 to output data and/or control signals to the signals lines 210. A receiver output 230 is coupled to the HS receiver 208 for receiving data transmitted to the PHY 200 via the signals lines 210. The squelch detector 216, upon detecting the start of a HS data packet, enables the HS receiver 208. Receiver output 232 is coupled to the LS/FS receiver 204 for receiving data transmitted to the PHY 200 via the signals lines 210. Driver input 234 is coupled to the LS/FS transmitter 202 for driving the LS/FS transmitter to output data and/or control signals to the signals lines 210.

The PHY 200 also includes a pair of pull-down resistors 206 used to detect device presence. Determining device presence refers to determining whether a device is physically and electrically connected to the PHY 200 through the signal lines 210. The pull-down resistors 206 may be approximately 15 Kohm resistors, for example. The pull-down resistors 206 may operate in conjunction with a pull-up resistor in the upstream port of the upstream device (not shown), which are connected to a voltage source. For example, the pull-up resistors of the upstream port may be approximately 1.5 Kohm resistors coupled to a voltage source of approximately 3.3 volts. When an upstream device is coupled to the PHY 200 through the signal lines 210, a DC path is created between one of the pull-down resistors 206 and the pull-up resistor of the upstream device. The DC path may consume approximately 600 uW of power. If the upstream device derives 3.3 volts from VBus, the idle power may be approximately 1 mW. The DC path creates logic '1' that is distinct from the situation when a upstream device is not connected. If an upstream device is disconnected, this DC path no longer exists, and the pull-down resistors 206 will ground the signal lines 210 to present logic '0', thus allowing the downstream port to later detect whether an upstream device has been connected. When the link is sent to a low power state, such as L1 or Suspend in the case of USB, the pull-down resistors 206 will continue to consume idle power as long as there is a DC path between the upstream device and the downstream device. The present disclosure provides a technique for eliminating or reducing this idle power.

In some embodiments, each of the pull-down resistors 206 are coupled to switches 238 configured to disable the pull-down resistors at selected times. Each of the switches 238 may be coupled in series between a pull-down resistor 206 and its respective signal line 212 or 214. Each of the switches 238 may be controlled by an input 240 from the Link layer 222. If the link is entered into a low power state such as L1 or Suspend, the Link layer sends a control signal to the switches 238 that opens the switches, thus eliminating the DC path between the pull-down resistors 206 and the pull-up resistors of the upstream device.

In some embodiments, the upstream device may be powered down during the low power state to save power. However, if the upstream device is powered down, the device may no longer be capable of remote wake in the case that an asynchronous event occurs that should cause the upstream device to resume the operation. Thus, if the upstream device is powered down, side-band signaling may be used to wake the upstream device. By disabling the pull-down resistors 206, the upstream device can remain powered while still enabling the reduction or elimination of idle power during the low power state of the link. In this way, side-band signaling can be eliminated while still improving the energy efficiency of the link.

In some embodiments, the pull-down resistors 206 are disabled for substantially the entire time that the link is in the low power state. For example, if the upstream device is an embedded device, a mechanical disconnect is no longer possible. Thus, the pull-down resistors can be disabled without the need to continuously monitor the device connectivity when in an L1 or Suspend state. Thus, the DC path can be effectively eliminated, saving 600 uW or 1 mW of idle power during the low power link state.

Figure 3:
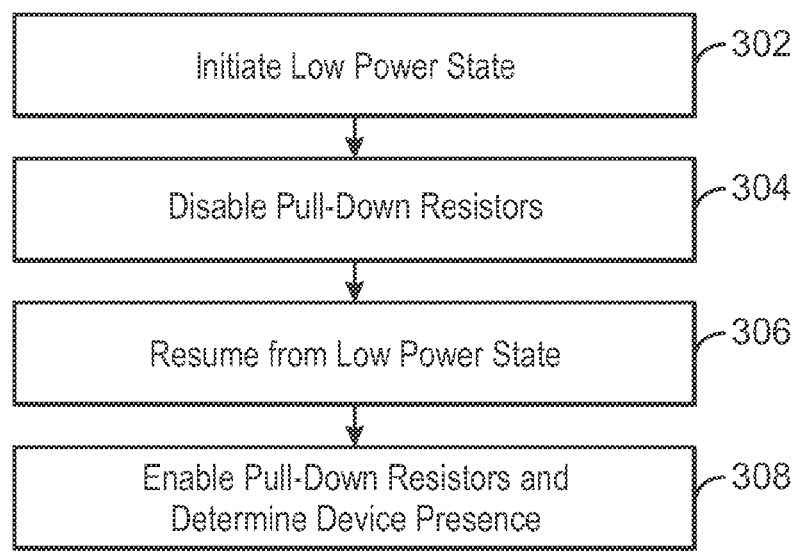
FIG. 3 is a process flow diagram of a method of operating a PHY, such as shown in FIG. 2.

FIG. 3 is a process flow diagram of a method of operating a PHY, such as the PHY shown in FIG. 2. In some embodiments, the method 300 is implemented for a PHY coupled to an embedded upstream device. For the sake of clarity, the method is described in relation to the PHY 200 shown in FIG. 2. However, it will be appreciated that the method 300 may be implemented in a various types of ports. The method 300 may be implemented by logic included, for example, in the Link layer 222 and the PHY 200 of FIG. 2. The logic is embodied in hardware, such as logic circuitry or one or more processors configured to execute instructions stored in a non-transitory, computer-readable medium, for example.

The method 300 may begin at block 302, wherein a low power state of a link is initiated, for example, by the Link layer 222 of FIG. 2. The low power state may be the L1 state or the Suspend state, for example.

At block 304, the pull-down resistors 206 of the downstream port may be disabled. For example, the pull-down resistors can be disabled by the Link layer 222 sending a control signal to the switches 238, thus eliminating the DC path between the downstream pull-down resistors and the upstream pull-up resistors of the device. The pull-down resistors 208 may remain disabled throughout the entire duration of the low power state.

At block 306, the host resumes the link from the low power state. At block 308, the pull-down resistors 206 may be enabled. In some embodiments, the embedded upstream device may be configured to be electrically disconnected. After enabling the pull-down resistors 206, device presence can be determined. In other words, it can be determined whether the embedded device is electrically connected or electrically disconnected using the pull-down resistors 206. For example, the Link layer 222 may declare device disconnect when it enables both pull-down resistors and observed SE0 in SE0 detector 220.

Figure 4:
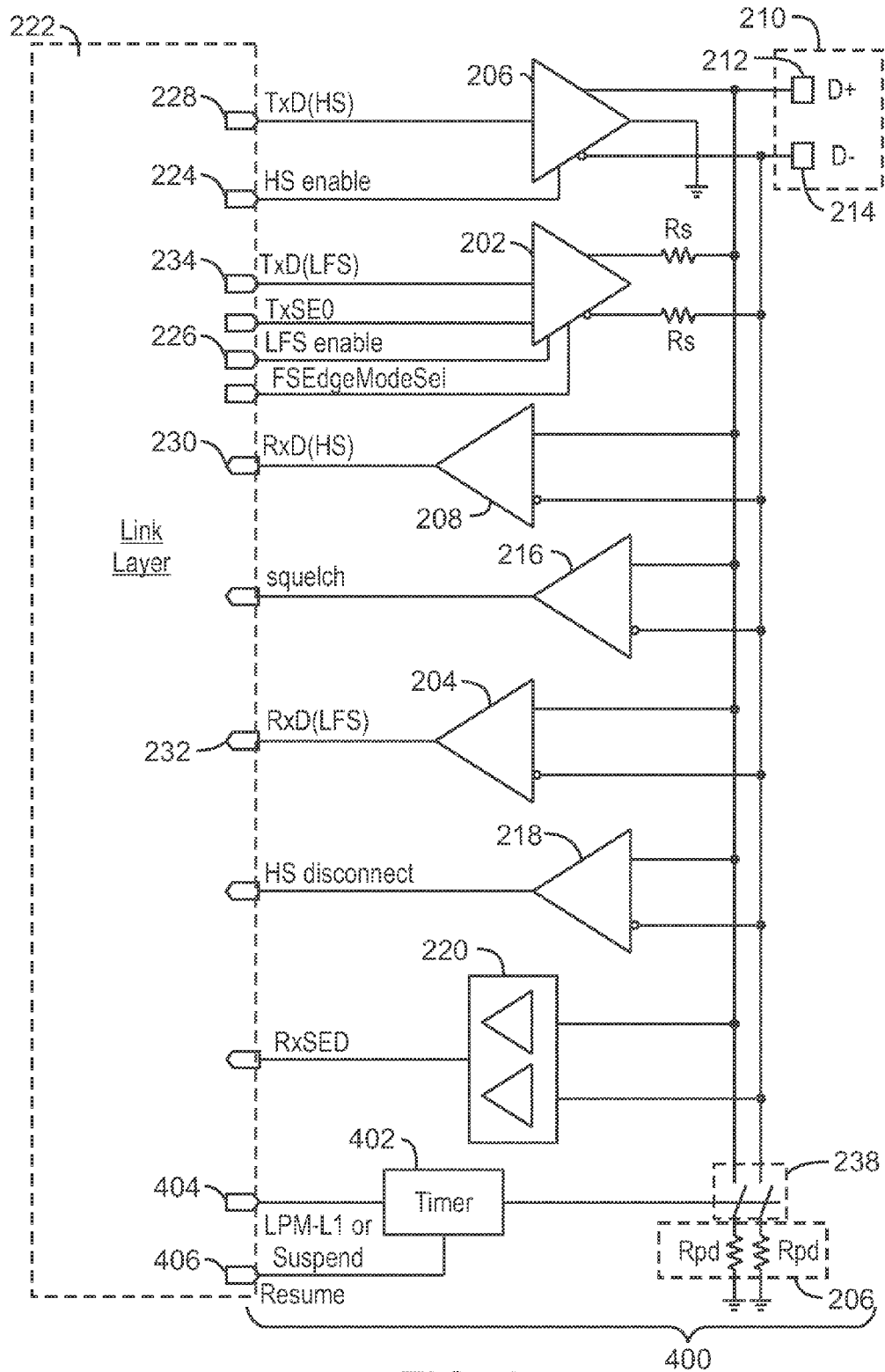
FIG. 4 is a block diagram of a USB physical layer configured to periodically perform device presence detection.

FIG. 4 is a block diagram of a USB physical layer configured to periodically perform device presence detection. In some embodiments, the physical layer (PHY) 400 is coupled to an upstream device that is mechanically connectable through a connector. The PHY 400 may be substantially similar to the PHY 200 of FIG. 2, except that the PHY 400 is configured to enable periodic monitoring of device presence. Periodic monitoring of device presence may be performed during a low power state of the link such as L1 or Suspend.

As described above in relation to PHY 200, the PHY 400 includes a pair of pull-down resistors 206 that operate in conjunction with one of the pull-up resistors in the upstream port of the upstream device (not shown) to detect device presence. Each of the pull-down resistors 206 may be coupled to switches 238, which are configured to disable the pull-down resistors 206 at selected times. If the link is entered into a low power state such as L1 or Suspend, the Link layer sends a control signal to the switches 238 that opens the switches, thus eliminating the DC path between the pull-down resistors 206 and the pull-up resistors of the upstream device. While in the low power state, the Link layer 222 may periodically monitor device presence by periodically re-enabling the pull-down resistors 206 for a short span of time. While the pull-down resistors 206 are enabled, the Link layer may determine whether the upstream device has been disconnected.

To perform the periodic monitoring of device presence, the PHY 400 may include a timer 402. The timer may receive one or more inputs from the Link layer 222, including a control signal 404 that indicates entry to the low power state and a control signal 406 that indicates a Resume from the low power state. An output of the timer 402 can be coupled to the switches 238 for controlling the disabling of the pull-down resistors 206. In some embodiments, the timer 402 is a very low power analog timer or digital counter. For example, the power consumption of the timer 402 may be on the scale of a few tens of micro Watts.

When the link enters the low power state, the timer 402 can be started by the Link layer 222. When the timer 402 is started, the timer 402 disables the pull-down resistors 206. While the timer 402 is running, the pull-down resistors 206 are disabled and the overall link power equals the power consumed by the timer 402. When the timer 402 expires, the downstream port performs a device presence detection by enabling the pull-down resistors 206, thus creating a DC path that consumes, for example, 600 micro Watts or 1 milliWatt for short period of time, for example, a few micro-seconds. If the device is still present, the downstream port will disable its pull-down resistors 206 and restart the timer 402 again. Device presence detection may be periodically performed according to any suitable period. For example, the pull-down resistors 206 may be periodically enabled approximately every 100 micro-seconds up to a few milli-seconds.

If the device is disconnected, the pull-down resistors 206 are kept enabled but consume no power. If the host resumes before the timer expiration, the downstream port can perform device connectivity detect at the beginning of Resume. For example, the Link layer 222 can terminate the running of the timer 402 and re-enable the pull-down resistors 206 through the control signal 406. According to the process described above, the average idle power consumed by the link during the low power state is effectively close to timer power, which may be a few tens of micro Watts.

Figure 5:
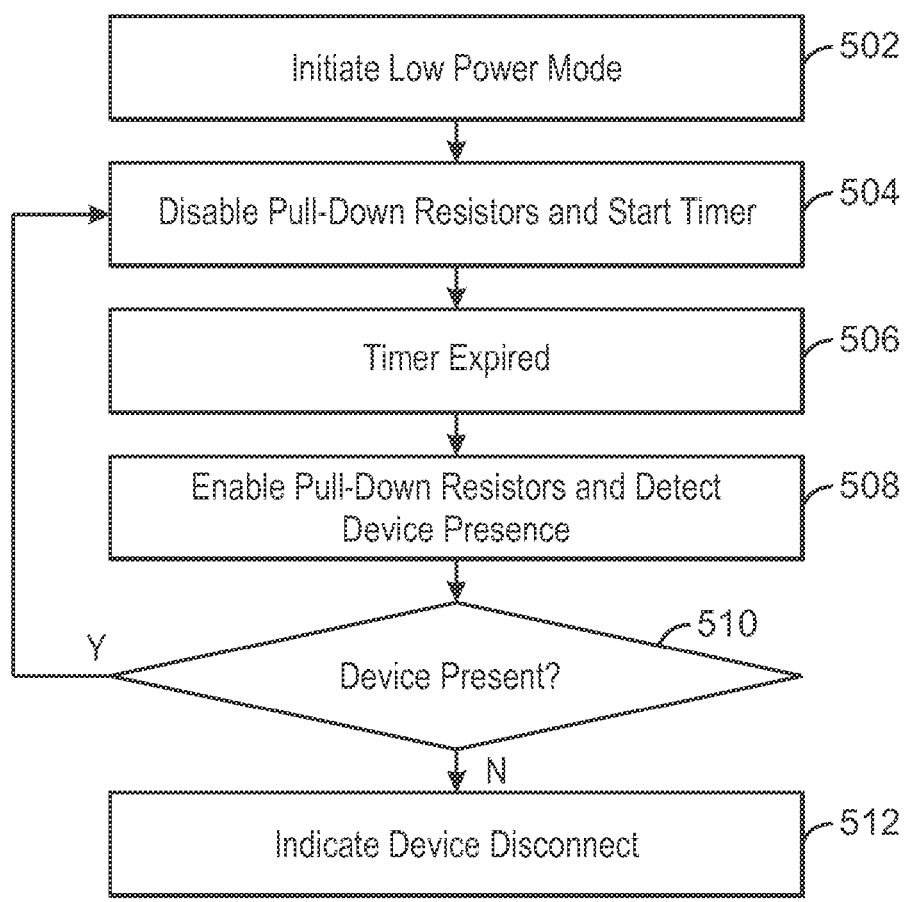
FIG. 5 is a process flow diagram of a method of operating a PHY, such as the PHY shown in FIG. 4.

FIG. 5 is a process flow diagram of a method of operating a PHY, such as the PHY shown in FIG. 4. In some embodiments, the method 500 is implemented for a PHY coupled to an external upstream device that can be mechanically decoupled. For the sake of clarity, the method 500 is described in relation to the PHY 400 shown in FIG. 4. However, it will be appreciated that the method 500 may be implemented in a various types of ports. The method 500 may be implemented by logic included, for example, in the Link layer 222 and the PHY 400 of FIG. 4. The logic is embodied in hardware, such as logic circuitry or one or more processors configured to execute instructions stored in a non-transitory, computer-readable medium, for example.

The method 500 may begin at block 502, wherein a low power state of a link is initiated, for example, by the Link layer 222 of FIG. 4. The low power state may be the L1 state or the Suspend state, for example.

At block 504, the pull-down resistors 206 of the downstream port may be disabled and a timer 402 started. For example, the pull-down resistors 206 can be disabled by the Link layer 222 sending a control signal to the timer 402, which starts the running of the timer 402 and causes the timer 402 to open the switches 238, thus eliminating the DC path between the downstream pull-down resistors and the upstream pull-up resistors of the device. The pull-down resistors remain disabled until the timer expires.

At block 506, a determination is made that the timer 402 has expired. At the expiration of the timer 402 device presence detection is performed.

At block 508, the pull-down resistors 206 are enabled. Once the pull-down resistors 206 are enabled, device presence is examined. For example, if SE0 detector detects SE0 when pull-down resistors are disabled, it may declare device disconnect.

At block 510, if the device is present, the process flow advances to block 504, and the pull-down resistors 206 of the downstream port are disabled and the timer 402 re-started. If at block 510 the device is not present, the process flow advances to block 512.

At block 512, an indication of device disconnect is indicated by the SE0 detector 220. Furthermore, the pull-down resistors 206 can be maintained in the enabled state for detection of a subsequent device connection. Because there is no external device coupled to the port, the pull-down resistors 206 do not form a DC path with the pull-resistors of an external device. Thus, the pull-down resistors consume no power while in the disconnected state. According to the process described above, the power consumption of the downstream port during the low power state is approximately equal to the power consumption of the tinier 402.

It is to be understood that implementation of the device connect and de of operation detection techniques described herein are not restricted to only USB implementations. In embodiments, the disconnect detection techniques described above can be applied to any Input/Output (I/O) standard that uses pull-up and or pull-down resistors to indicate device presence.

Although some embodiments have been described in reference to particular implementations, other implementations are possible according to some embodiments. Additionally, the arrangement and order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An electronic device, comprising:
   a downstream port comprising a physical layer to send and receive data to an upstream device via a link, the physical layer comprising:
   a pull-down resistor to determine presence of the upstream device; and
   a switch coupled to the pull-down resistor, the switch to disable the pull-down resistor in response to the downstream port initiating a low power state of the link between the downstream port and the upstream device, wherein the switch is controlled by input from a link layer of the downstream port; and
   wherein the physical layer comprises a timer to perform periodic monitoring of the presence of the upstream device, the link layer of the downstream port to start the timer upon entering the low power state and, at the expiration of the timer, enable the pull-down resistor for a predetermined amount of time to determine whether the upstream device has been disconnected, wherein if the upstream device is detected as present, the downstream port is to disable the pull-down resistor and restart the timer.

2. The electronic device of claim 1, wherein the downstream port is to enable the pull-down resistor and determine device presence upon resuming from the low power state.

3. The electronic device of claim 1, comprising, if the upstream device is connected, re-starting the timer and disabling the pull-down resistor.

4. The electronic device of claim 1, wherein the downstream port is a Universal Serial Bus (USB) port.

5. The electronic device of claim 1, wherein the upstream device is coupled to the downstream port by a connector and during the low power state the power consumption of the downstream port is approximately equal to the power consumption of the timer.

6. The electronic device of claim 1, wherein the upstream device is an embedded device and, during the low power state, the embedded device remains powered and the downstream port consumes no power at the link between the downstream port and the embedded device.

7. The electronic device of claim 1, wherein the low power state is a USB L1 or Suspend state.

8. The electronic device of claim 1, wherein the switch is coupled in series between the pull-down resistor and a respective signal line.

9. The electronic device of claim 1, wherein if the upstream device is disconnected, the pull-down resistor is to be kept enabled but consume no power.

10. The electronic device of claim 1, wherein if the electronic device resumes before timer expiration, the link layer is to terminate a running of the timer and re-enable the pull-down resistor.

11. A Universal Serial Bus (USB) port, comprising:
    a pull-down resistor used to determine whether a device is coupled to the USB port;
    a switch coupled to the pull-down resistor, the switch to disable the pull-down resistor in response to the USB port initiating a low power state of a link between the USB port and the device, wherein the switch is controlled by input from a link layer of the USB port; and
    a physical layer comprising a timer to perform periodic monitoring of the presence of the upstream device, the link layer of the USB port to start the timer upon entering the low power state and, at an expiration of the timer, enable the pull-down resistor for a predetermined amount of time to determine whether the device has been disconnected, wherein if the device is detected as present, the downstream port is to disable the pull-down resistor and restart the timer.

12. The USB port of claim 11, wherein the USB port is to enable the pull-down resistor and determine device presence upon resuming from the low power state.

13. The USB port of claim 11, comprising, if the device is connected, re-starting the timer and disabling the pull-down resistor.

14. The USB port of claim 11, wherein the device is coupled to the USB port by a connector and during the low power state the power consumption of the USB port is approximately equal to the power consumption of the timer.

15. The USB port of claim 11, wherein the USB port is a USB 2 port.

16. The USB port of claim 11, wherein the device is an embedded device and during the low power state the embedded device remains powered and the USB port consumes no power at the link between the downstream port and the embedded device.

17. A computing device, comprising logic to:

determine device presence using a pull-down resistor disposed in a downstream port;

initiate a low power state of a link between the downstream port and an upstream device;

in response to initiating the low power state, send a control signal from a link layer of the downstream port to a switch to disable the pull-down resistor; and in response to initiating the low power state, start a timer to perform periodic monitoring of the presence of the upstream device via the link layer of the downstream port; and at an expiration of the timer, enable the pull-down resistor for a predetermined amount of time to determine whether the upstream device has been disconnected, wherein if the upstream device is detected as present, the downstream port is to disable the pull-down resistor and restart the timer.

18. The computing device of claim 17, comprising logic to:

resume from the low power state; and in response to resuming from the low power state, enable the pull-down resistor and determine device presence.

19. The computing device of claim 17, comprising logic to:

if the device is connected, re-start the timer and disable the pull-down resistor.

20. The computing device of claim 17, wherein the link is a Universal Serial Bus (USB) link.

* * * * *